(12) United States Patent
Izzat et al.

(10) Patent No.: US 9,030,530 B2
(45) Date of Patent: May 12, 2015

(54) STEREO-IMAGE QUALITY AND DISPARITY/DEPTH INDICATIONS

(75) Inventors: Izzat Izzat, Plainsboro, NJ (US); Feng Li, Newark, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 301 days.

(21) Appl. No.: 13/515,605

(22) PCT Filed: Dec. 13, 2010

(86) PCT No.: PCT/US2010/003151
§ 371 (c)(1),
(2), (4) Date: Jun. 13, 2012

(87) PCT Pub. No.: WO2011/081646
PCT Pub. Date: Jul. 7, 2011

(65) Prior Publication Data
US 2012/0249750 A1    Oct. 4, 2012

Related U.S. Application Data

(60) Provisional application No. 61/284,201, filed on Dec. 15, 2009.

(51) Int. Cl.
*H04N 13/00* (2006.01)
*G06T 7/00* (2006.01)
*H04N 13/02* (2006.01)

(52) U.S. Cl.
CPC .......... *G06T 7/0022* (2013.01); *H04N 13/0018* (2013.01); *H04N 13/0022* (2013.01); *H04N 13/0033* (2013.01); *H04N 13/025* (2013.01); *H04N 2213/002* (2013.01); *G06T 2207/10021* (2013.01)

(58) Field of Classification Search
None
See application file for complete search history.

(56) References Cited

U.S. PATENT DOCUMENTS 8,045,792 B2 * 10/2011 Koo et al. ............... 382/154
8,384,763 B2 *  2/2013 Tam et al. ............... 348/43
8,787,654 B2 *  7/2014 Zhang et al. ............ 382/154
(Continued)

FOREIGN PATENT DOCUMENTS

WO    WO2009139740    11/2009

OTHER PUBLICATIONS

Li et al.., "A Hybrid Camera for Motion Deblurring and Depth Map Super-Resolution," IEEE Conference on Computer Vision and Pattern Recognition, 2008 (CVPR 2008), Jun. 23, 2008, pp. 1-8.
(Continued)

*Primary Examiner* — Jay Au Patel
*Assistant Examiner* — Reza Aghevli
(74) *Attorney, Agent, or Firm* — Robert D. Shedd; Brian J. Cromarty

(57) ABSTRACT

A variety of implementations are described. At least one implementation modifies one or more images from a stereo-image pair in order to produce a new image pair that has a different disparity map. The new disparity map satisfies a quality condition that the disparity of the original image pair did not. In one particular implementation, a first image and a second image that form a stereo image pair are accessed. A disparity map is generated for a set of features from the first image that are matched to features in the second image. The set of features is less than all features in the first image. A quality measure is determined based on disparity values in the disparity map. The first image is modified, in response to the determined quality measure, such that disparity for the set of features in the first image is also modified.

28 Claims, 13 Drawing Sheets

(56) References Cited

U.S. PATENT DOCUMENTS

| | | | |
|---|---|---|---|
| 2004/0240725 A1* | 12/2004 | Xu et al. | 382/154 |
| 2007/0024614 A1 | 2/2007 | Tam | |
| 2008/0218612 A1* | 9/2008 | Border et al. | 348/262 |
| 2008/0240549 A1 | 10/2008 | Koo et al. | |
| 2009/0153652 A1* | 6/2009 | Barenbrug | 348/54 |
| 2009/0160931 A1* | 6/2009 | Pockett et al. | 348/42 |
| 2009/0207235 A1* | 8/2009 | Francini et al. | 348/46 |
| 2009/0279741 A1* | 11/2009 | Susca et al. | 382/107 |

OTHER PUBLICATIONS

Sun et al., "Evaluating Methods for Controlling Depth Perception in Stereoscopic Cinematography," Proc SPIE—IS & T Electronic Imaging, vol. 7237 . 2009, 12 pages.

Campisi et al., "Stereoscopic Images Quality Assessment," Copyright 2007 EURASIP, EUSIPCO. Poznan 2007. pp. 2110-2114.

Yano et al., "Two Factors in Visual Fatigue Caused by Stereoscopic HDTV Images," Elsevier B.V., Displays 25, available online Oct. 19, 2004, pp. 141-150.

Benoit et al., "Using Disparity for Quality Assessment of Streoscopic Images," IEEE Int'l. Conference on Image Processing (ICIP 2008), San Diego, US, Version 1 Sep. 23, 2008, 4 pages.

Hoffman et al., "Vergence-accommodation Conflicts Hinder Visual Performance and Cause Visual Fatigue," Journal of Vision (2008) 8(3):33, published Mar. 28, 2008, pp. 1-30.

Lang et al., "Nonlinear Disparity Mapping for Stereoscopic 3D," ACM Transactions on Graphics in 2010 (Proc. SIGGRAPH), vol. 29, No. 3, 10 pages.

Search Report dated Mar. 18, 2011.

* cited by examiner

STEREO-IMAGE QUALITY AND DISPARITY/DEPTH INDICATIONS

CROSS-REFERENCE TO RELATED APPLICATIONS

This application claims the benefit, under 35 U.S.C. §365 of International Application PCT/US2010/003151, filed Dec. 13, 2010, which was published in accordance with PCT Article 21(2) on Jul. 7, 2012 in English and which claims the benefit of U.S. provisional patent application No. 61/284,201, filed Dec. 15, 2009.

TECHNICAL FIELD

Implementations are described that relate to three-dimensional video. Various particular implementations relate to processing stereo image pairs.

BACKGROUND

The last few years have shown increasing interest in stereoscopic technology driven by the entertainment industry, and other scientific applications. The market for stereoscopic technology in the home is expected to grow with 3D televisions ("TVs") becoming more widely used. Quality measures for two-dimensional ("2D") applications have been extensively studied. The use of stereoscopic technology, however, introduces a number of problems not present in 2D. Hence, 2D quality measures such as Peak Signal Noise Ratio ("PSNR") cannot typically be used effectively to measure stereo-image content quality. Quality measurement can be achieved using subjective or objective measures. The subjective measures are usually the most effective, and are widely used in the entertainment industry. However, such subjective measures are often time consuming, and analysis of the results is frequently not straight forward.

SUMMARY

According to a general aspect, a first image and a second image that form a stereo image pair are accessed. A disparity map is generated for a set of features from the first image that are matched to features in the second image. The set of features is less than all features in the first image. A quality measure is determined based on disparity values in the disparity map. The first image is modified, in response to the determined quality measure, such that disparity for the set of features in the first image is also modified.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
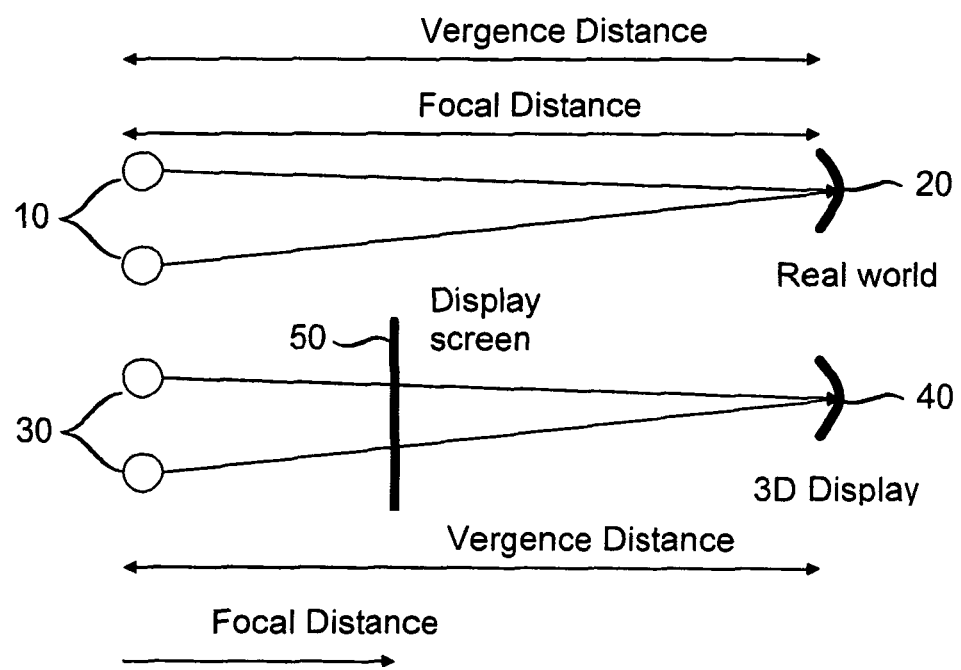
FIG. 1 is a diagram depicting vergence distance and focal distance.

At least one implementation in this application describes a new approach for performing stereo-image quality assessment. One such implementation uses, among other features, disparity information to measure quality of stereo-image content and to improve quality by adjusting disparity values. The implementation generates a sparse disparity map and assesses quality based on the sparse disparity map. In particular, the quality is assessed for a sequence of images based on the range of disparity and the rate of disparity change. If the quality is insufficient, the sequence of images is modified so that the resulting disparity produces an improved quality rating. Significant advantages are obtained by using a sparse disparity map, rather than, for example, a full disparity map. Such advantages include, for example, computation savings and time savings. Additionally, the results are promising, despite the previously prevailing sentiment that sparse disparity maps were not adequate as a basis for such quality assessments or for the resulting modifications to the images.

Disparity range and disparity rate of change can have strong impact on a viewer's visual fatigue in stereo-image playback. Additionally, there is a desire to adjust disparity values based on display type, display size, and user preference. At least one implementation first measures quality using two disparity related measures. The first disparity related measure is the range of disparity, and the second is the rate of disparity change. These measures can be used in many parts of the stereo-image chain including acquisition, post production, display, etc. to improve stereo-image quality.

In at least one implementation, these measures are computed from a sparse disparity (or depth) map due to, for example, the difficulty in computing a dense disparity (or depth) map. The disparity values can then be adjusted either automatically to match the display type, for example, or manually by the user to reflect the user's disparity preference. The disparity values are typically adjusted indirectly by modifying one or more of the stereo images.

Accurate disparity computation contributes to the successful implementation of a quality measure that is based on disparity. However, accurate disparity computation is usually a difficult problem for live content. Accordingly, at least one implementation uses a sparse disparity computation method that produces reliable results but might not provide the exact range of disparity.

To enhance stereo-image quality, in many implementations the disparity information is adjusted to match the display type, display size, user preference, or other factors. A number of approaches may be used to adjust (that is, increase or decrease) disparity information.

The use of disparity information is based on the analysis of the human visual system. Visual fatigue can be related to both the amount of disparity displayed on the screen and the change in disparity. The design of an effective stereo-image quality measure is aided by a good understating of the problem associated with viewing stereo-image content. It is well known that viewing stereo-images can cause visual discomfort.

Referring to FIG. 1, there is a representation of vergence and accommodation issues. FIG. 1 illustrates the vergence and focal distances for the real world and for a 3D display. The mismatch between vergence and accommodation, or vergence and focal distances, may be the main reason for visual discomfort in viewers. Such discomfort can result in visual fatigue which decreases the performance of the visual system and may cause health issues if content is viewed for a long time. The visual discomfort can be reduced by limiting the disparity range on the display. The range allowed depends on the display type, display size, and viewer location.

The human eye can tolerate some mismatch but an excessive amount causes eye fatigue. Also, the eye can comfortably fuse a limited range of disparity, within which no blur is perceived and hence stereo-image viewing is comfortable. However even within the comfortable zone, visual discomfort may occur if the disparity rate of change is high. Further, the discomfort may become severe with prolonged viewing at a short viewing distance.

To elaborate on the physiological issues, note that in the real world, the vergence and focal distances are the same, as shown in the top half of FIG. 1. That is, as a pair of eyes 10 view an object 20, the focus point of the eyes 10 is on the object 20. Additionally, the eyes 10 also move so that the eyes 10 both point to the object 20, thus the vergence point for the eyes 10 is also on the object 20. In the real world, then, the focus point and the vergence point are the same. Analogously, the focus distance and the vergence distance are also the same. This is how the human brain and human eyes expect things to be.

Considering now displayed content, as shown in the bottom half of FIG. 1, when a pair of eyes 30 views a perceived 3D object 40 on a display screen 50, the focus point of the eyes 30 is always on the display screen 50. However, because the object 40 is displayed in 3D, the object 40 appears to be at a distance that is different from the distance to the display screen 50. In the example of FIG. 1, the perceived distance of the object 40 is further away from the eyes 30 than the display screen 50. Thus, the eyes 30 attempt to point at the perceived distance of the object 40, making the vergence distance larger than the focal distance. Because the focal distance is different from the vergence distance, the eyes 30 will typically experience some strain.

Additionally, when the depth of an object changes in the real world, human eyes have to adjust both the focus point and vergence point to the same new distance. However, when viewing 3D content, human eyes maintain the same focus point, but change the vergence point. If depth changes are frequent and abrupt, human eyes have to frequently and abruptly change the vergence point while maintaining the focus point, which can result in strain on the eye muscles.

Thus, it is desirable to define a quality measure for stereo-images that accounts for these causes of visual discomfort. It is also desirable to provide a system that detects these causes of visual discomfort, and performs corrective action to reduce these causes of visual discomfort. At least one implementation described in this application measures quality using disparity range and the temporal rate of disparity change. The measure can be used in a number of locations within the stereo chain. For example:

1.) At stereo-image acquisition: The measure can provide a warning to the camera operator that the range of disparity is too high or the disparity motion is too fast. The operator can then adjust the camera conversion and the speed of movement. This is typically critical for live action if there is no correction possible in post production.

Figure 2:
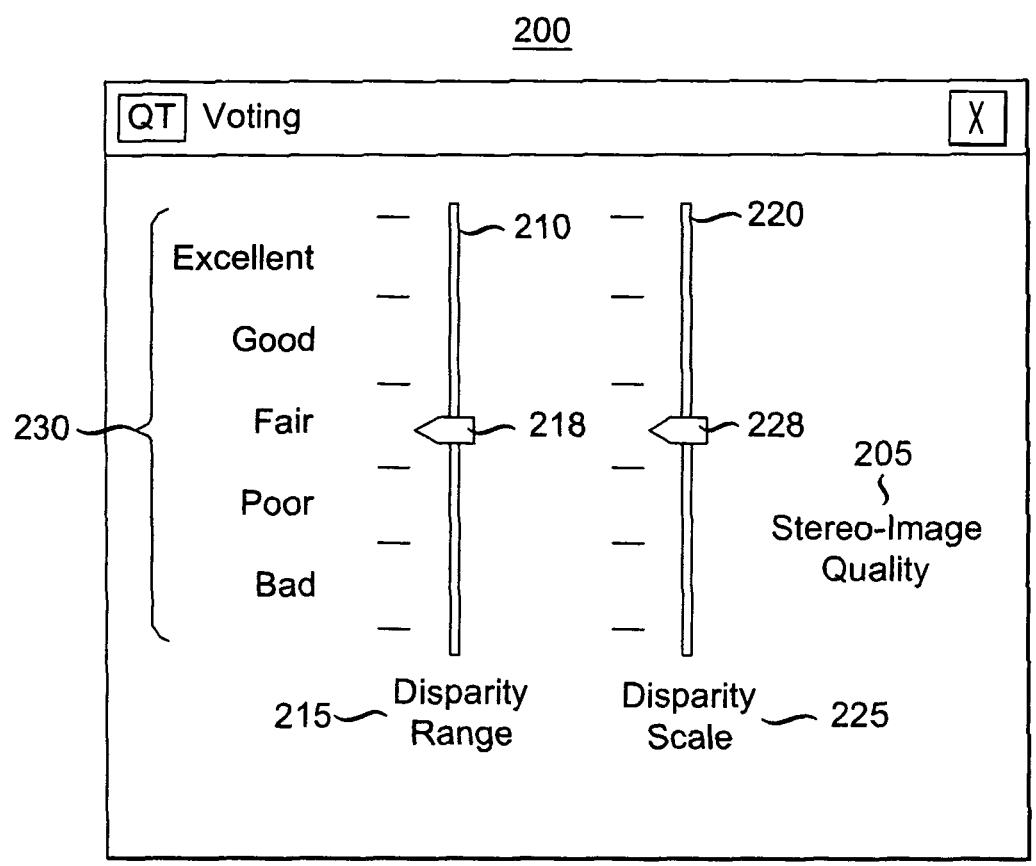
FIG. 2 is a diagram depicting an example of an input device for indicated quality.

The information is provided, in one implementation, using an interface 200 as shown in FIG. 2. The interface 200 includes a label 205, indicating that the interface 200 provides information on Stereo-Image Quality. The interface 200 includes a first slider 210 having a label 215 of Disparity Range. The interface 200 includes a second slider 220 having a label 225 of Disparity Scale. The sliders 210 and 220 provide information, in one implementation, to an operator. In one implementation of the interface 200, the sliders 210, 220 provide an indication of the actual stereo-image quality, by indicating a level of Disparity Range and of Disparity Scale. The levels are indicated by slider buttons 218 and 228, which are positioned by the implementation to reflect the actual values of Disparity Range and Disparity Scale for the picture, scene, or film (for example) under consideration. The slider buttons 218 and 228 are interpreted by the operator by determining where the slider buttons 218 and 228 intersect a quality descriptor 230. The quality descriptor 230 has the quality descriptions of Excellent, Good, Fair, Poor, and Bad.

In practice, the operator may determine that the best operation range is between a certain minimum and maximum. For example, in one implementation, the minimum is "Fair" and the maximum is "Excellent".

In another implementation, numeric values for the Disparity Range and the Disparity Scale are provided in a display to the operator, and a range of the numeric values is associated with a quality measure. For example, in one implementation a range of 10-20 is associated with "Bad" quality.

In another implementation, the quality descriptor 230 is re-interpreted. Note that if the Disparity Range slider 210 is low, then 3D effects are minimal, while if the Disparity Range is high, then 3D effects are more enhanced and may cause visual fatigue. Accordingly, in one implementation, a quality descriptor 230 indication of "Poor" is actually desirable because the video is intended for an audience and/or a display that cannot tolerate much 3D.

Other implementations also use a display to mark points on an image based on disparity. In one such implementation, the color red is used to mark points on the image having a high value of disparity.

2.) In post production: Stereo-image content usually goes through extensive post production. The quality measure can be used to provide information to the post production operator to help adjust disparity. The information can be a simple slider such as the example shown in FIG. 2, discussed above, and also discussed in more detail further below. Additionally, in another implementation, the sliders of FIG. 2 are used as a feedback mechanism from the operator to adjust the 3D effects. The operator can do this, in one implementation, by moving the slider to set a different value for, for example, "disparity range" and/or "disparity scale". "Disparity range" allows an operator to adjust the maximum and/or minimum disparity by making the range larger or smaller. "Disparity scale" sets a scale that is used to scale all disparities for a given scene or shot. Moving the sliders changes not only the actual disparity values for a given picture (in one implementation) or scene (in another implementation), but also changes the rate of change of disparity. Thus, the interface 200 is adapted in such an implementation to both provide information to the operator that indicates the current stereo-image quality, and to allow the operator to change that quality.

3) At the display: The range of disparity and the rate of disparity change depend on the display type (for example, liquid crystal display ("LCD"), digital light processing ("DLP")), the display size, or possibly user preference. The comfortable viewing range ("CVR") can be determined using subjective evaluation of the TVs. The quality measure may be used to adjust quality automatically or manually based on user preference up to a certain limit as allowed by the display.

The quality measure described in at least one implementation benefits from a reliable computation of disparity values. This is a relatively easy task for computer generated imagery ("CGI") but is usually more difficult and time consuming for live action content. Therefore we propose, in at least one implementation, to use a sparse depth or disparity computation for live content. In this approach, the depth computation is only done at locations with good features thus resulting in more reliable depth computations. The result is then used to compute the maximum disparity, the minimum disparity, and the rate of disparity change. In various implementations, the rate of disparity change includes the rate of change of the maximum disparity, the rate of change of the minimum disparity, or the rate of change of both the maximum and minimum disparities.

Figure 3:
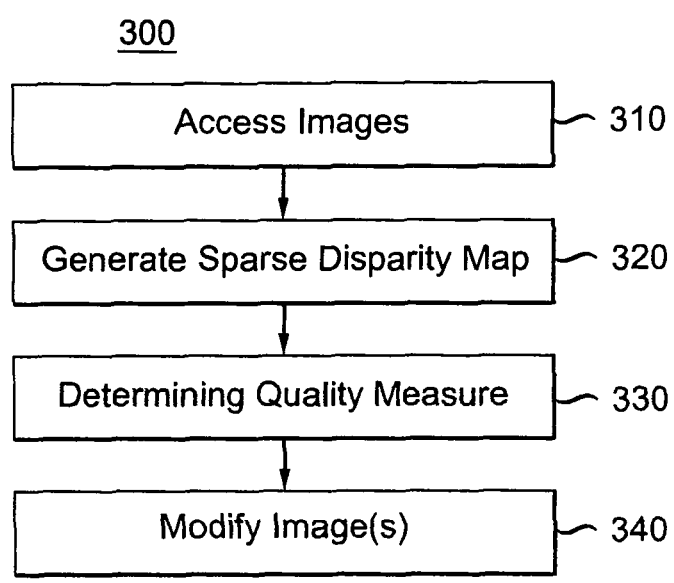
FIG. 3 is a block/flow diagram depicting an example process for modifying images based on a quality measure.

Referring to FIG. 3, a process 300 is shown that provides an example of a process for determining a quality measure that is based on disparity (or depth) and for modifying one or more images based on that quality measure. The process 300 includes accessing images (310). The accessed images include, in at least one implementation, a stereo pair of images.

The process 300 includes generating a sparse disparity map (320). Various implementations for performing operation 320 are described with respect to FIGS. 4 and 5 below. The process 300 also includes determining a quality measure based on the sparse disparity map (330), and then modifying one or more of the accessed images based on the quality measure (340). Operations 320-340 will be discussed in turn below.

Figure 4:
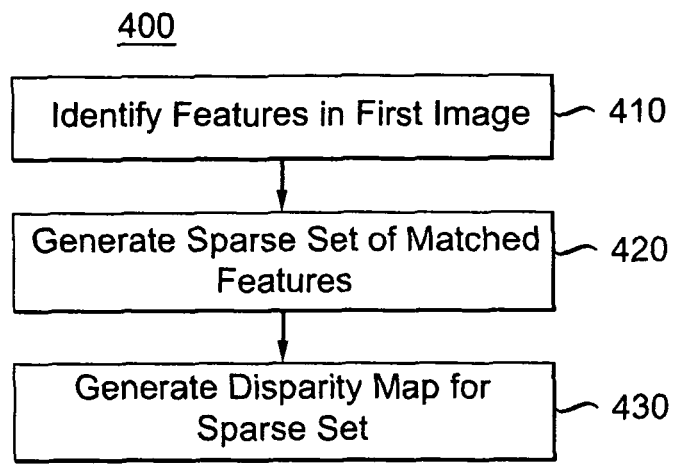
FIG. 4 is a block/flow diagram depicting an example process for generating a sparse disparity map.

Referring to FIG. 4, a process 400 is shown that provides an example implementation of operation 320. The process 400 includes identifying features in a first of the accessed images (410). The process 400 also includes generating a sparse set of matched features (420). Various implementations for performing operations 410 and 420 are described with respect to FIG. 5 below. Finally, the process 400 includes generating a disparity map for the sparse set of matched features (430). Operations 410-430 will be discussed in turn below.

Figure 5:
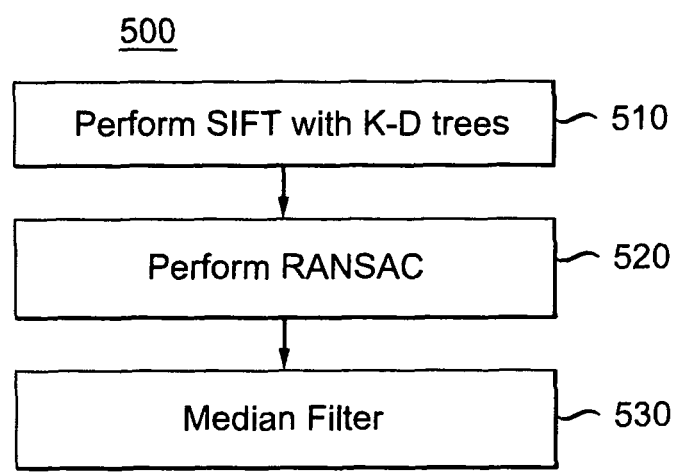
FIG. 5 is a block/flow diagram depicting an example process for generating a sparse set of matched features.

Referring to FIG. 5, a process 500 is shown that provides an example implementation of operations 410 and 420. The process 500 includes performing a scale-invariant feature transform ("SIFT") using a k-d tree analysis (510). For at least one implementation, we adopt the well-known SIFT computation method to extract features among stereo images. Each SIFT feature is described by a vector of 128 dimensions. To avoid a time-consuming brute-force search to find corresponding feature points between two stereo images, we first construct k-d trees based on SIFT features, and then find the corresponding features by using a nearest neighbor algorithm. The application of k-d trees, and a nearest neighbor search, to SIFT features (vectors) is well known.

Even though SIFT feature matching is generally robust, there could still exist outliers. Accordingly, the process 500 includes performing a random sample consensus ("RANSAC", for RANdom SAmple Consensus) algorithm (520). The RANSAC algorithm uses an Epipolar Geometry constraint, and is implemented to prune the SIFT feature matching result.

The inventors have observed, however, that even after removing outliers using RANSAC, there are often depth inconsistencies between two consecutive frames in the same scene. That is possible because some features are detected in one frame but not detected in the other. In one implementation, the depth "inconsistencies" that are detected include situations in which a feature in one image is matched to an incorrect feature in a second image. The median filter, in such an implementation, attempts to smooth the disparity values, and remove the impact of the inconsistency. Note that in this particular implementation, if the implementation does not find a corresponding feature in the second image, due to, for example, occlusion, then the implementation ignores the feature.

Accordingly, the process 500 includes a median filtering operation (530). A median filter is applied to each image belonging to the same scene to filter out noise. In practice, in at least one implementation, the filter is applied to the disparity values and not directly to the image.

Figure 6A:
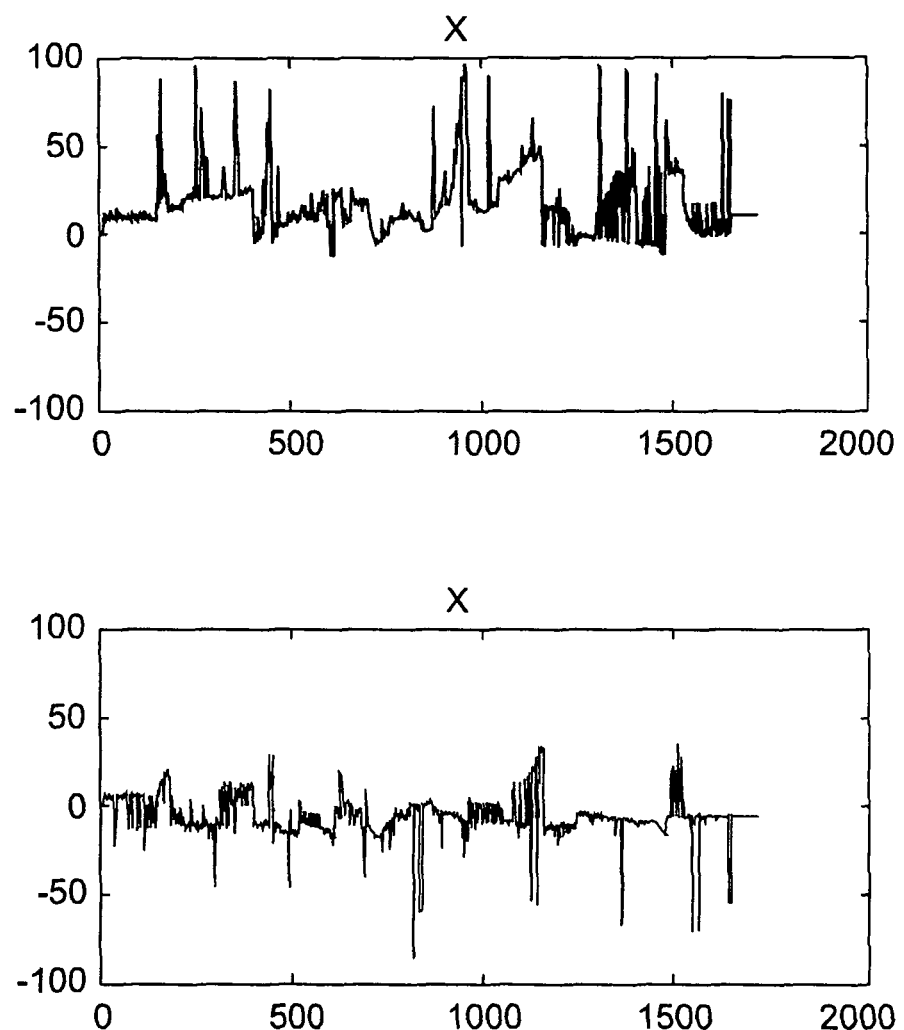
FIG. 6(a) include graphs depicting maximum and minimum disparity values without scene-based median filtering.
Figure 6B:
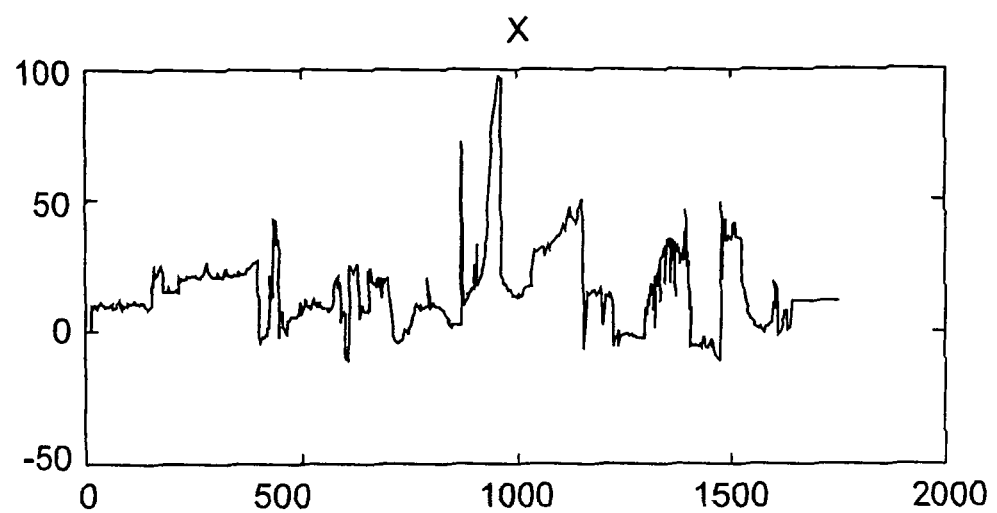
FIG. 6(b) include graphs depicting maximum and minimum disparity values with scene-based median filtering.
Figure 6B:
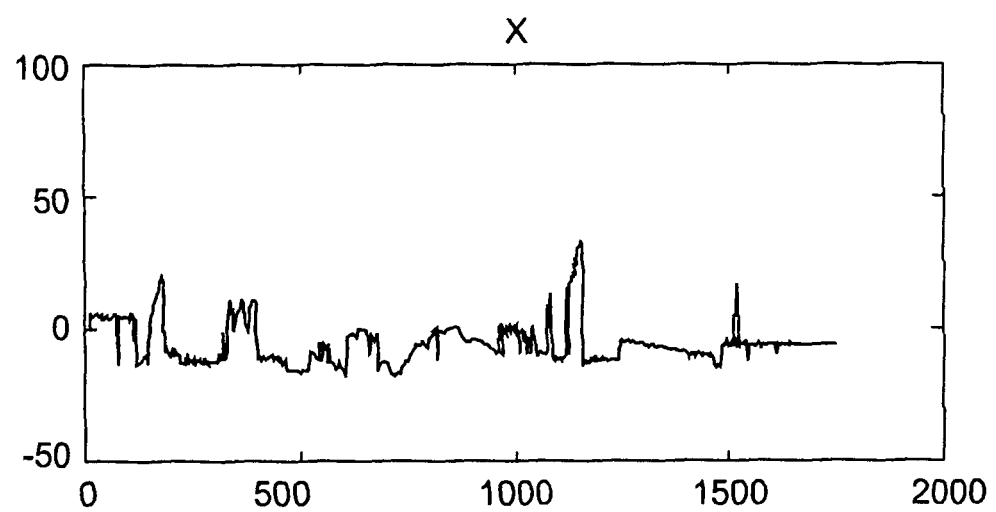

Referring to FIGS. 6(a)-6(b), it is shown that the noise in the maximum/minimum disparity for the whole sequence is effectively suppressed, or smoothed. That is, in this implementation, the large variation of disparity is reduced. FIG. 6(a) shows the maximum (top graph) and minimum (bottom graph) disparities for each frame without scene-based median filtering. FIG. 6(b) shows the maximum (top graph) and minimum (bottom graph) disparities for each frame with scene-based median filtering. Thus, FIGS. 6(a) and 6(b) have a numeric value on the y-axis indicating either the maximum or minimum disparity value. The x-axis of FIGS. 6(a) and 6(b) indicates the images (or frames) in the video. Accordingly, FIGS. 6(a) and 6(b) provide maximum and minimum disparity values for each image in the video.

Figure 7A:
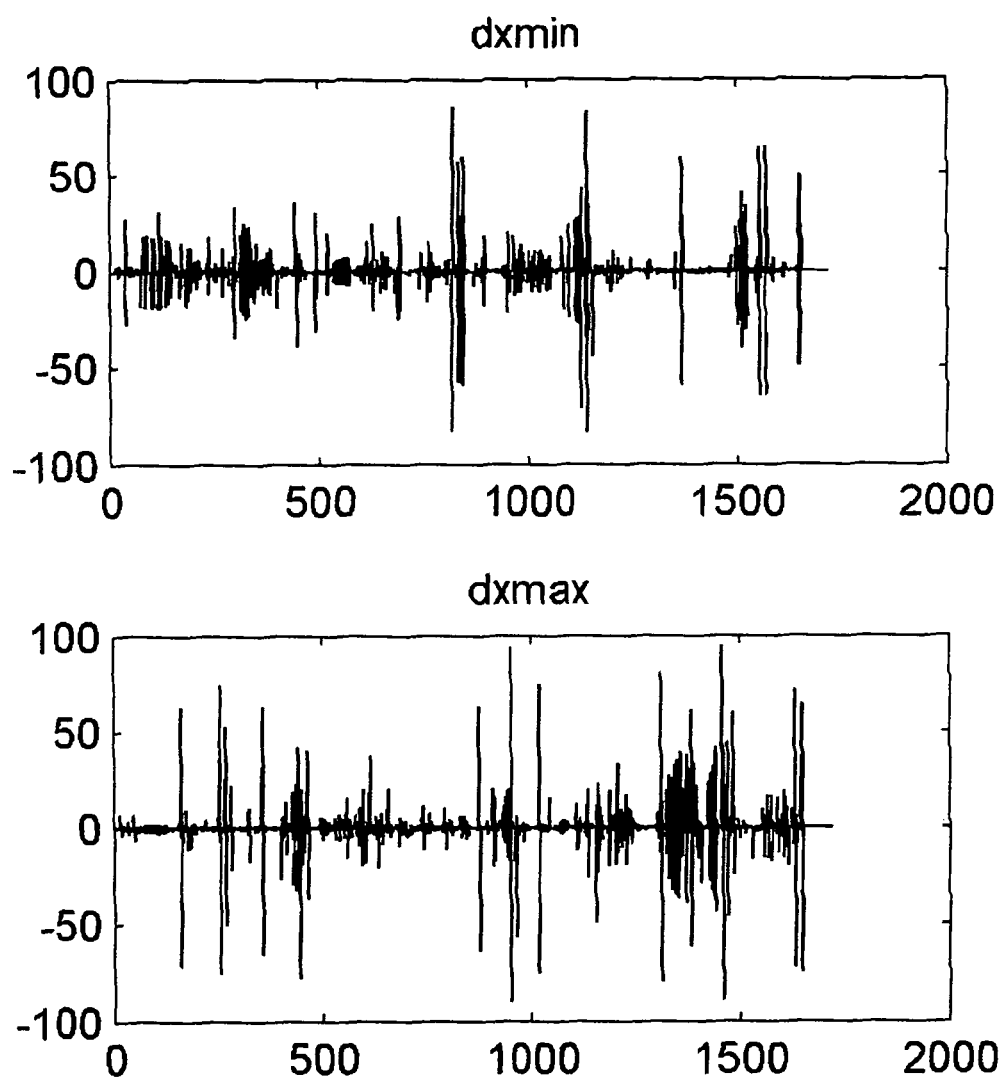
FIG. 7(a) includes graphs depicting derivatives of maximum and minimum disparity values without scene-based median filtering.
Figure 7B:
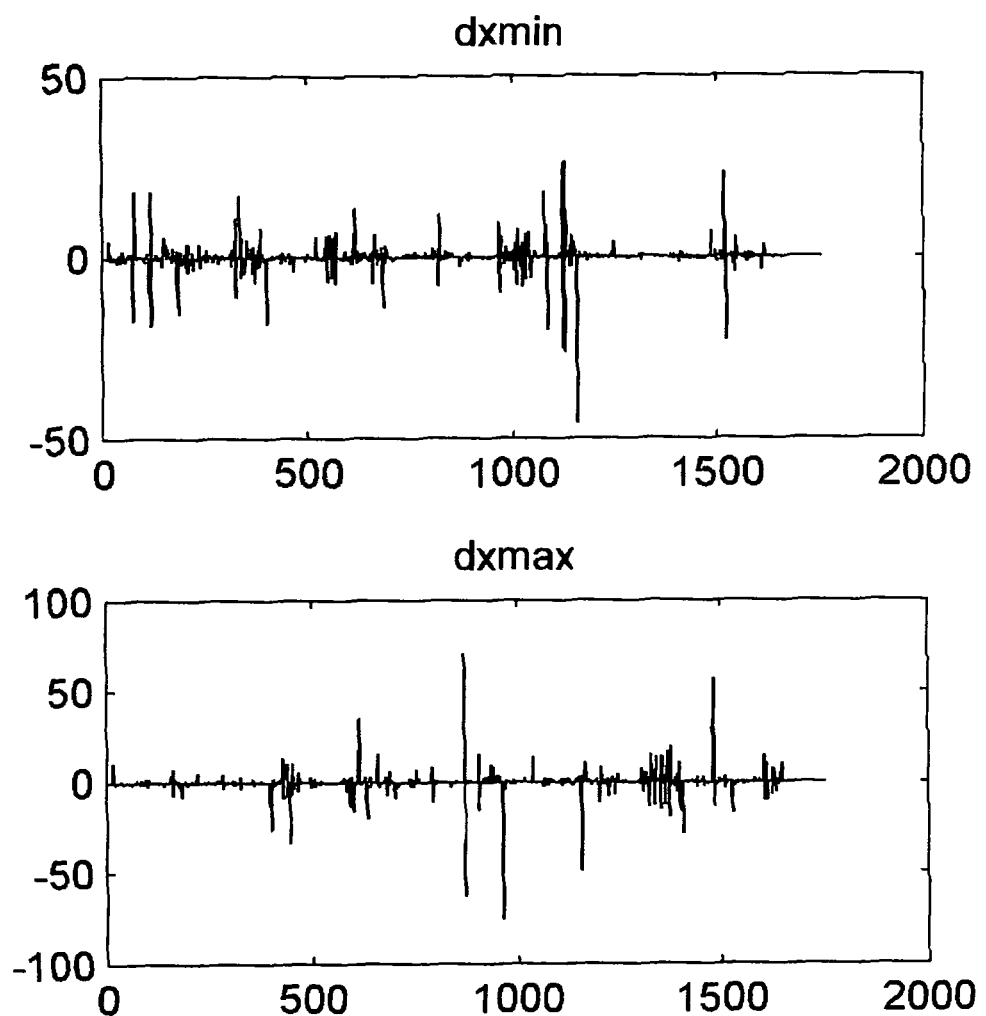
FIG. 7(b) includes graphs depicting derivatives of maximum and minimum disparity values with scene-based median filtering.

Referring to FIGS. 7(a)-(b), it is shown that the noise in the rates of change of the maximum and minimum disparity is also effectively suppressed. FIG. 7(a) shows the derivative of the minimum disparities from FIG. 6(a) (top graph), and the derivative of the maximum disparities from FIG. 6(a) (bottom graph) for each frame without scene-based median filtering. FIG. 7(b) shows (top graph) the derivative of the minimum disparities from FIG. 6(b), and also shows (bottom graph) the derivative of the maximum disparities from FIG. 6(b) for each frame with scene-based median filtering. Thus, FIGS. 7(a) and 7(b) have a numeric value on the y-axis indicating the derivatives, and the x-axis indicates the images (or frames) in the video.

A brief discussion follows of one particular implementation, as well as variations of that implementation, before returning to the discussion of the figures. Note that in this particular implementation, the ordinary SIFT algorithm identifies features in both images separately and independently, and then attempts to match the features. The SIFT algorithm computes 128 measures at each pixel. These 128 measures are used to describe the point and to match the point with a point in a second image. SIFT is not used, in this implementation, to perform the feature matching directly. Rather, a k-d tree framework is used to reduce the search space and to perform the matching.

Using the k-d tree, the implementation finds the best match for a given point (called a "nearest neighbor"). The nearest neighbor search is performed in terms of the "space" of the SIFT features, which is 128 dimensions.

The implementation attempts to mach all features. If the implementation does not find a good match for a given feature, then that feature is removed.

RANSAC is then used to eliminate outlier matches. There is no guarantee that all outliers are removed.

The implementation then median filters the disparity values for a given feature across all pictures in the sequence for that view.

One aspect of this implementation is the use of a sparse disparity map. Implementations are able to limit the number of features being considering at various points in the process. For example, one implementation reduces the set of features from a robust, complete, or dense set to a sparse set during the SIFT algorithm. Another implementation reduces the feature set during the RANSAC algorithm. Another implementation reduces the feature set during the median filtering algorithm. Another implementation reduces the feature set during multiple of these algorithms.

Various implementations also allow a user to define the size of the sparse feature set. For example, various implementations allow a user to specify the number of features. For example, in several such implementations an operator is able to specify that the sparse set will include (i) the first 100 features, (ii) the 100 features with the highest confidence of being tracked throughout the scene, or (iii) the 100 features with the highest "match" score. Additionally, in other implementations, the availability of resources is used to determine how many features, for example, 50 or 250, are included in the sparse feature set. In one implementation, the resources that are considered include the available processing power and the available memory.

After the feature matching computation for the whole video sequence, which includes operations 410-420 and 510-530, a sparse set of matched features has been determined for each stereo-image pair. The process 400 includes generating a disparity map for the sparse set of matched features (430). In at least one implementation, for every matched feature, the disparity is readily available and can be computed from the locations of the matched features. In one implementation, the disparity value is computed for every matched feature, and a disparity map is the resulting map for every picture. The map provides a disparity value for each pixel, or provides an indication that there is no feature at that pixel (for example, indicating "unknown" disparity).

Referring again to FIG. 3, the process 300 includes determining a quality measure (330). After obtaining the sparse disparity map from operation 430, it is straightforward to compute a variety of statistical features for each stereo-image pair. At least one implementation computes four metrics which are (i) maximum disparity, (ii) minimum disparity, (iii) change rate of maximum disparity, and (iv) change rate of minimum disparity. These quality measures are determined, in one implementation, for every picture. In another implementation, the quality measures are determined once for a scene. The scene-based determination is, in various implementations, a function of the picture-based values, such as, for example, an average, median, or mode. In another implementation, the scene-based determination computes the quality measures for a given picture in the scene (in one example, the first key frame is used) and those quality measures are used for the rest of the scene.

Note that in one implementation, the maximum (and/or minimum) disparity for every picture in a scene is associated with different objects. Nonetheless, the rate of change of the maximum (and/or minimum) is still computed, as this implementation is interested in a rate of change that is not object related. Another implementation, however, focuses on object-related rates of disparity change. In another implementation, other quality measures are generated, including, but not limited to, one or more of disparity range (which is equal to the maximum disparity minus the minimum disparity).

It is worth noting at this point, that disparity and depth can be used interchangeably in implementations unless otherwise indicated or required by context. Using equation 1, we know disparity is inversely-proportionally related to scene depth.

$$D = \frac{f \cdot b}{d} \quad (1)$$

where D describes depth, b is baseline between two stereo-image cameras, f is the focal length for each camera, and d is the disparity for two corresponding feature points. Equation (1) above is valid for parallel cameras with the same focal length. More complicated formulas can be defined for other scenarios but in most cases Equation (1) can be used as an approximation.

Referring again to FIG. 7, in one implementation, big jumps in FIG. 7(*b*) are used to verify the validity of the scene-based adjustment discussed in the next paragraph.

Referring again to FIG. 3, the process 300 includes modifying one or more images based on the determined quality measure (340). As mentioned before, maximum and minimum depth should be within the CVR to reduce visual discomfort. Note that both depth and disparity can be used to determine CVR, however disparity is generally easier to compute and is therefore more widely used. It is typically difficult to dynamically change the stereo-image camera setup for each frame whose maximum and/or minimum depth is beyond the CVR. That is, the operator for a content creator might notice that disparity is beyond the CVR, but the operator typically has limitations that preclude the operator from moving the cameras (to change "b", the baseline, or "f", the focal length) and reshooting that frame. One of these limitations is the fact that, generally, such a frame-by-frame process would destroy the depth consistency for consecutive video sequences. Accordingly, in one implementation we do scene-based depth adjustment to help to ensure that the camera setup is consistent during each scene. Additionally, the scene-based depth adjustment also attempts to make the transition between scenes smooth. Note that, in general, it is better to correct the disparity as much as possible at the capture stage, in order to reduce the complexity of post-processing.

There are a number of methods for adjusting disparity information. Such methods include, for example, shifting in the x-direction, scaling+shifting, and/or interpolation. These methods are generally fast and simple to implement. However, these methods may not always produce good results because the information of stereo-image camera setup is encoded in the images through occlusion regions. That is, although you can adjust the disparity in post-processing, the results are not correct all the time because you have lost information from the occlusion regions that was not captured by the cameras. After the images are captured, this information is fixed and cannot be changed by just shifting. Therefore, as a picture is modified in post-processing, previously covered background areas (occlusions) are exposed, but the data for those occlusions is not available to fill the exposed occlusions.

In order to adjust the parallax (that is, to adjust the disparity values) for the video sequence, one has to generate new stereo-image pairs with other methods. Such methods include, in various implementations, in-painting and/or background estimation.

Figure 8:
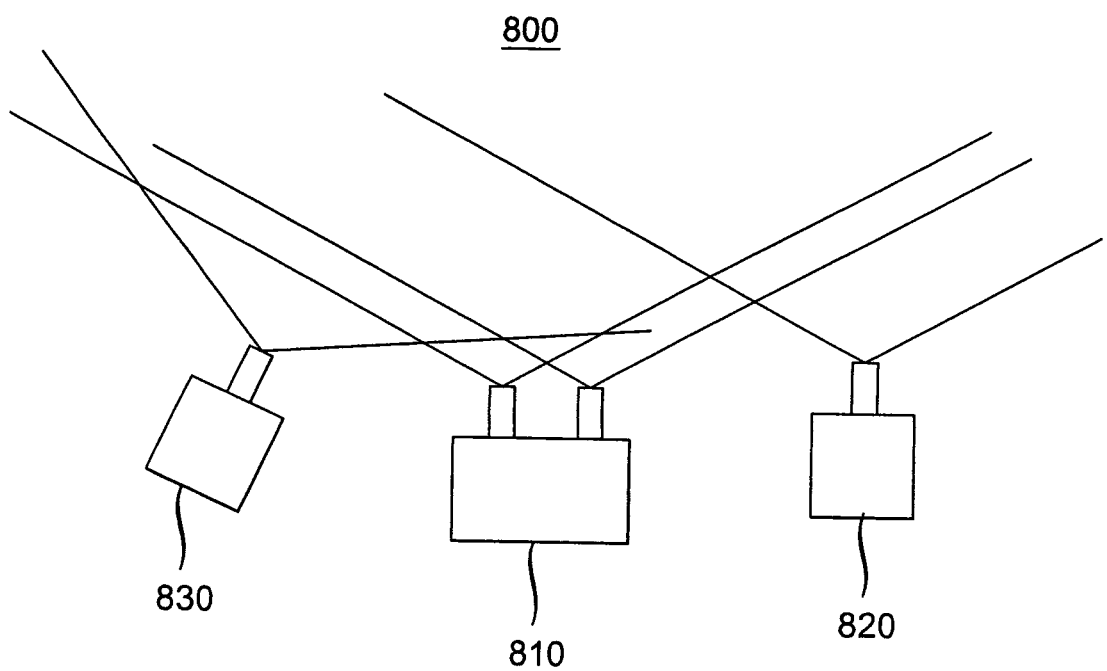
FIG. 8 is a block diagram depicting an example of a hybrid camera system that may be used with one or more implementations.

Referring to FIG. 8, a system 800 is shown that provides an implementation for generating new stereo-image pairs. The system 800 is a hybrid camera system that integrates a stereo-image film camera 810 with several low resolution cameras. The low resolution cameras include a first low resolution camera 820 and a second low resolution camera 830. The three cameras are synchronized by either a hardware or a software synchronizer, or a synchronizer using a combination of hardware and software. The setup of the system 800 is flexible, and is not restricted to horizontal design. For example, it can be seen that the first low resolution camera 820 is in horizontal alignment with the stereo-image film camera 810. However, the second low resolution camera 830 is not in horizontal alignment with the stereo-image film camera 810 or the first low resolution camera 820. Additionally, the second low resolution camera 830 is not in a parallel configuration with either of the cameras 810 and 820. In other terminology, the second low resolution camera 830 has been subjected to a yaw rotation with respect to the configuration of the cameras 810 and 820.

In another implementation, the second low resolution camera 830 is displaced vertically from both of the cameras 810 and 820. In yet another implementation, the second low resolution camera 830 is rotated about the remaining two degrees of freedom (pitch and roll), which is also in contrast to the two cameras 810 and 820.

The system 800 may be used to generate new stereo image pairs. In one implementation, a process for generating stereo-image pairs includes (i) first computing a high-resolution high-quality disparity map from the hybrid camera system 800, and (ii) using this high-quality disparity map to generate the new stereo image pairs.

To compute the high-resolution high-quality disparity map, all of the cameras 810, 820, and 830 are used. The resolution of the stereo-image film camera 810 is downsampled to the same resolution as the first and second low resolution cameras 820 and 830. Then an accurate low resolution disparity map is computed for the stereo-image film camera 810 based on the array of cameras 810, 820, and 830 using existing techniques, such as, for example, multi-view based depth reconstruction methods. A depth super-resolution algorithm is used to upsample a low resolution depth map to obtain the final high resolution high quality disparity map. For details of one implementation of this process, see, for example, the paper titled *A Hybrid Camera for Motion Deblurring and Depth Super-resolution*, IEEE Conference on Computer Vision and Pattern Recognition 2008, June 2008, available at http://www.cis.udel.edu/~feli/papers/cvpr08-hybrid.pdf. The contents of that paper is hereby incorporated by reference in its entirety for all purposes.

A high-resolution high-quality disparity map typically provides a lot of benefits. One such benefit is that it allows new images to be synthesized at some virtual viewpoints, such that the re-rendered stereo-image pair has good visual quality.

Note that various features are combined in certain implementations. In one such implementation, we first use a sparse disparity map to measure the visual quality, fatigue, etc. of, for example, a film captured with a hybrid camera system 800. Second, if the disparity range needs to be changed during the post-processing stage, for example, for a different delivery medium (such as, for example, DVD for TV, DVD for Computer Display/Projector, or film) or for fatigue adjustment, then the earlier capture of the film using the hybrid camera system 800 provides additional information allowing those changes to be made more effectively.

Note that the hybrid camera system 800 uses low resolution cameras in order to reduce cost. A low resolution camera is less expensive than a full HD ("high definition") stereo-image film camera. By adding the two low resolution cameras 820, 830 into the system 800, we are able to get, in effect, 4 low resolution cameras after down sampling the images captured by the full size (high resolution) stereo-image film camera 810. This will typically be sufficient to produce an accurate low resolution depth map. In general, the use of more cameras allows the generation of a more accurate disparity map. This is because there are more constraints for the disparity estimation algorithm when there are more cameras.

The high resolution images captured by the stereo-image film camera 810 are then used as guidance to upsample the low resolution disparity map. Note that we can compute a high resolution disparity map directly from the stereo-image film camera 810. However, the 4 camera approach will typically generate a more accurate disparity map as compared to the process of generating a high resolution disparity map directly from the stereo-image film camera 810. This is due, as indicated above, to the use of more constraints (4 cameras) to solve the disparity estimation problem.

The use of multiple cameras will allow us to generate new stereo-image pairs with at least two different algorithms. The first is an interpolation algorithm, and the second is a light field rendering technique.

In an implementation using the first algorithm, we start from the computed high-resolution, high-quality disparity map, and scale it up by some factor. For example, if we want to increase the parallax between the stereo-image pair by 1.5 times, then we scale the disparity map by 1.5 and use it for image warping. The missing area in the final image is smoothly interpolated by using natural coordinate interpolation, or by using the low resolution cameras 820 and 830, or both. In one implementation, natural coordinate interpolation and/or the use of the low resolution camera images is accomplished using known techniques that are performed during warping.

The term parallax refers to the distance between the two cameras in a stereo pair. If we increase the parallax between the stereo-image cameras, we could have an enlarged disparity range. If the disparity range is enlarged too much, this may exaggerate visual fatigue. Conversely, if the parallax is too small, we may have less interesting stereo (3D) effects. One extreme case occurs when the two cameras coincide with each other. This would give us no stereo (3D) effects at all. To increase the stereo (3D) effects, we increase the parallax. This is a common practice to adjust the disparity range.

In an implementation using the second algorithm, we view the camera array as a light field. Further, we use a light field rendering technique to generate a new stereo-image pair.

Figure 9:
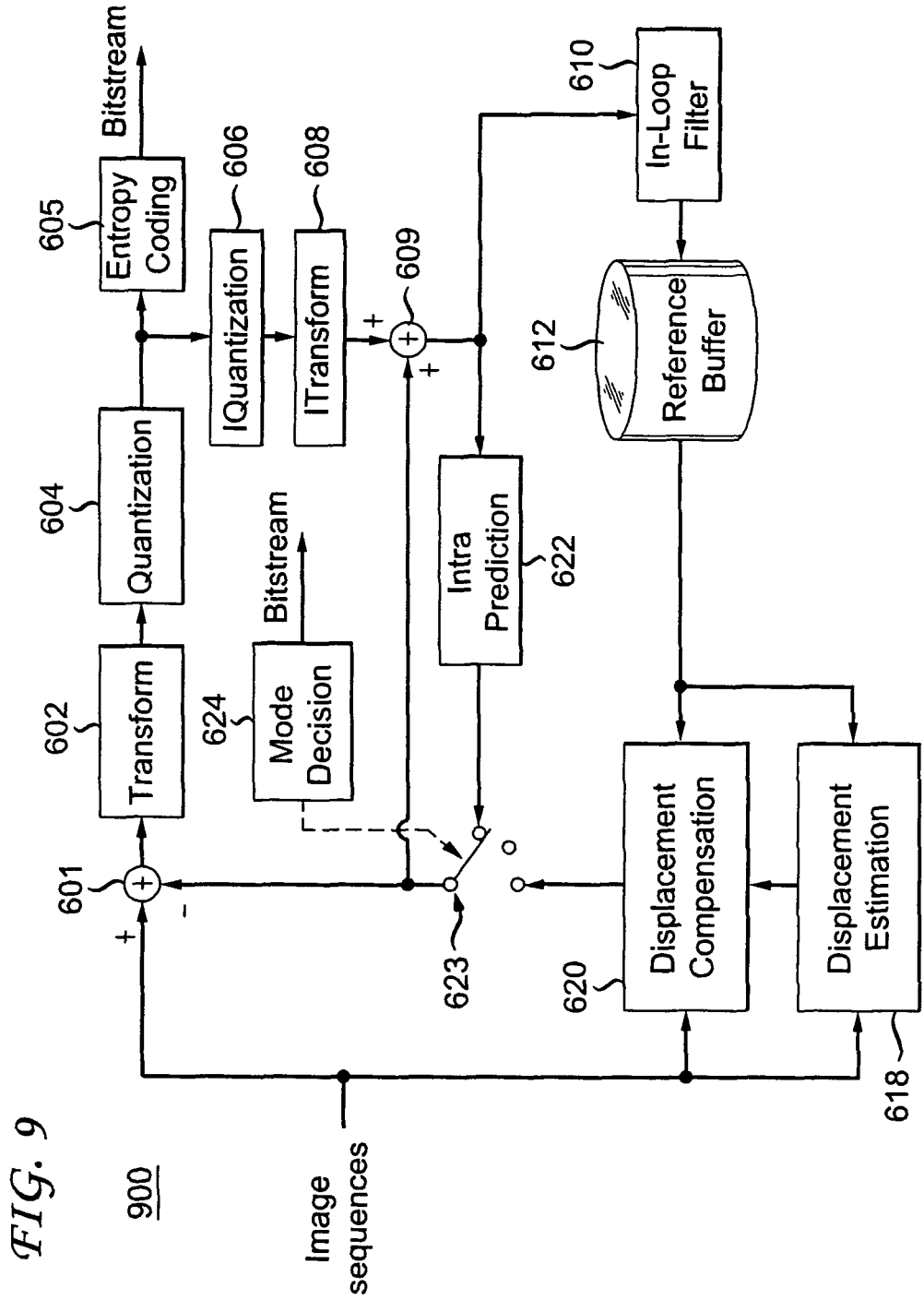
FIG. 9 is a block/flow diagram depicting an example of an encoding system that may be used with one or more implementations.

Referring to FIG. 9, an encoder 900 depicts an implementation of an encoder that encodes images. In one implementation, the encoder 900 encodes stereo images that have been processed to adjust disparity based on a quality measure. In another implementation, the encoder 900 is also used to encode disparity maps for images. In one implementation, the encoder 900 is implemented as part of a video transmission system as described below with respect to FIG. 11.

An input image sequence arrives at adder 601 as well as at displacement compensation block 620 and displacement estimation block 618. Note that displacement refers, for example, to either motion or disparity. Another input to the adder 601 is one of a variety of possible reference picture information received through switch 623.

For example, if a mode decision module 624 in signal communication with the switch 623 determines that the encoding mode should be intra-prediction with reference to the same block or slice currently being encoded, then the adder receives its input from intra-prediction module 622. Alternatively, if the mode decision module 624 determines that the encoding mode should be displacement compensation and estimation with reference to a block or slice that is different from the block or slice currently being encoded, then the adder receives its input from displacement compensation module 620.

The adder 601 provides a signal to the transform module 602, which is configured to transform its input signal and provide the transformed signal to quantization module 604. The quantization module 604 is configured to perform quantization on its received signal and output the quantized information to an entropy encoder 605. The entropy encoder 605 is configured to perform entropy encoding on its input signal to generate a bitstream. The inverse quantization module 606 is configured to receive the quantized signal from quantization module 604 and perform inverse quantization on the quantized signal. In turn, the inverse transform module 608 is configured to receive the inverse quantized signal from module 606 and perform an inverse transform on its received signal. Modules 606 and 608 recreate or reconstruct the signal output from adder 601.

The adder or combiner 609 adds (combines) signals received from the inverse transform module 608 and the switch 623 and outputs the resulting signals to intra prediction module 622 and in-loop filter 610. Further, the intra prediction module 622 performs intra-prediction, as discussed above, using its received signals. Similarly, the in-loop filter 610 filters the signals received from adder 609 and provides filtered signals to reference buffer 612, which provides image information to displacement estimation and compensation modules 618 and 620.

Metadata may be added to the encoder 900 as encoded metadata and combined with the output bitstream from the entropy coder 605. Alternatively, for example, unencoded metadata may be input to the entropy coder 605 for entropy encoding along with the quantized image sequences.

Figure 10:
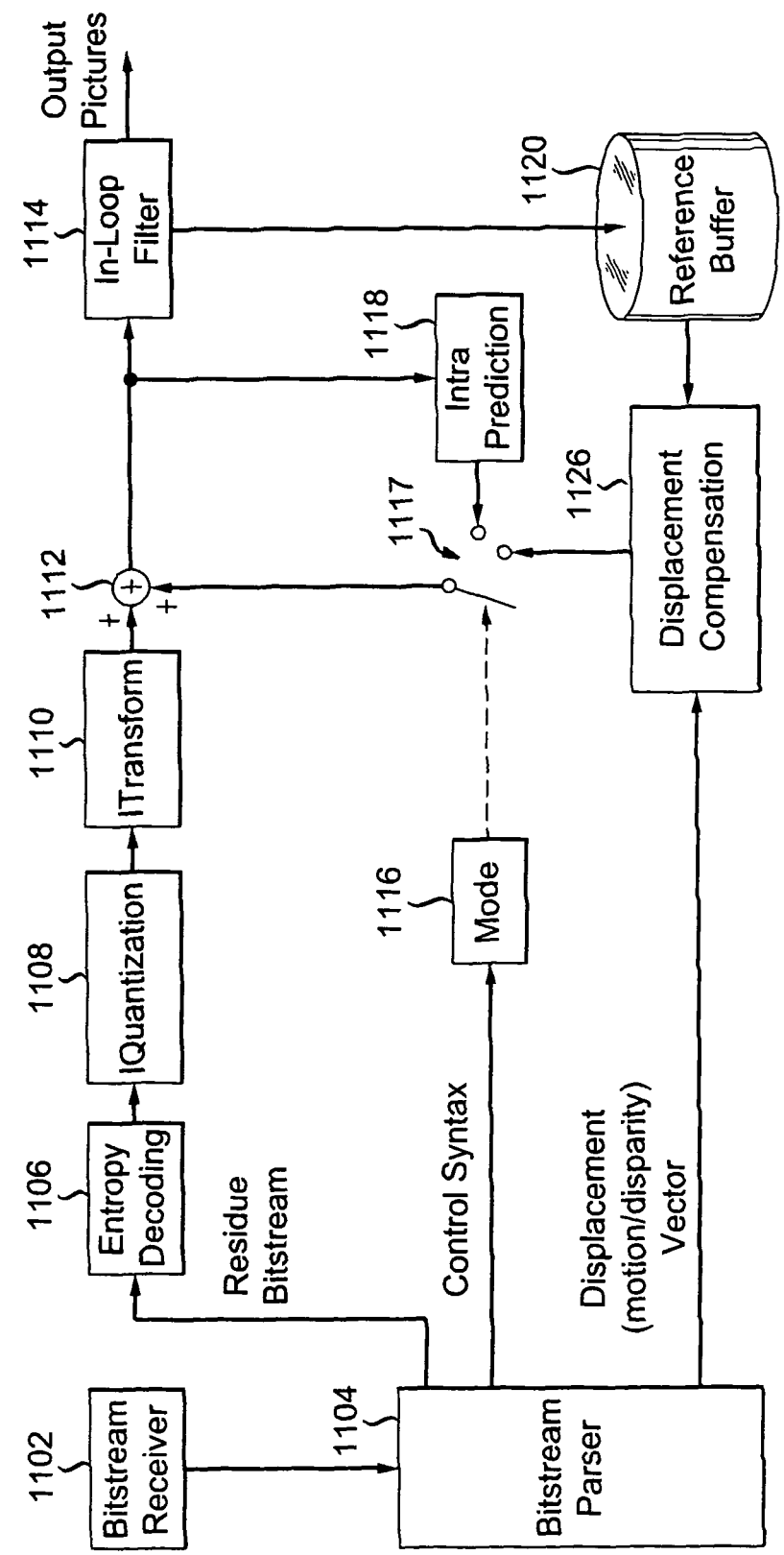
FIG. 10 is a block/flow diagram depicting an example of a decoding system that may be used with one or more implementations.

Referring to FIG. 10, a decoder 1000 depicts an implementation of a decoder. In one implementation, the decoder 1000 is used to decode images and provide them to a processing device for modifying the decoded images to produce disparity values that are within a determined quality measure. In another implementation, the decoder 1000 is used to decode images that have already been adjusted so that the disparity values for the images are within a determined quality measure. In another implementation, the decoder 1000 is used to decode disparity maps for images. In another implementation, the decoder 1000 is implemented as part of a video receiving system as described below with respect to FIG. 12.

The decoder 1000 can be configured to receive a bitstream using bitstream receiver 1102, which in turn is in signal communication with bitstream parser 1104 and provides the bitstream to parser 1104. The bit stream parser 1104 can be configured to transmit a residue bitstream to entropy decoder 1106, transmit control syntax elements to mode selection module 1116, and transmit displacement (motion/disparity) vector information to displacement compensation module 1126. The inverse quantization module 1108 can be configured to perform inverse quantization on an entropy decoded signal received from the entropy decoder 1106. In addition, the inverse transform module 1110 can be configured to perform an inverse transform on an inverse quantized signal received from inverse quantization module 1108 and to output the inverse transformed signal to adder or combiner 1112.

Adder 1112 can receive one of a variety of other signals depending on the decoding mode employed. For example, the mode decision module 1116 can determine whether displacement compensation or intra prediction encoding was performed on the currently processed block by the encoder by parsing and analyzing the control syntax elements. Depending on the determined mode, mode selection control module 1116 can access and control switch 1117, based on the control syntax elements, so that the adder 1112 can receive signals from the displacement compensation module 1126 or the intra prediction module 1118.

Here, the intra prediction module 1118 can be configured to, for example, perform intra prediction to decode a block or slice using references to the same block or slice currently being decoded. In turn, the displacement compensation module 1126 can be configured to, for example, perform displacement compensation to decode a block or a slice using references to a block or slice, of the same frame currently being processed or of another previously processed frame that is different from the block or slice currently being decoded.

After receiving prediction or compensation information signals, the adder 1112 can add the prediction or compensation information signals with the inverse transformed signal for transmission to an in-loop filter 1114, such as, for example, a deblocking filter. The in-loop filter 1114 can be configured to filter its input signal and output decoded pictures. The adder 1112 can also output the added signal to the intra prediction module 1118 for use in intra prediction. Further, the in-loop filter 1114 can transmit the filtered signal to the reference buffer 1120. The reference buffer 1120 can be configured to parse its received signal to permit and aid in displacement compensation decoding by element 1126, to which the reference buffer 1120 provides parsed signals. Such parsed signals may be, for example, all or part of various images.

Metadata may be included in a bitstream provided to the bitstream receiver 1102. The metadata may be parsed by the bitstream parser 1104, and decoded by the entropy decoder 1106. The decoded metadata may be extracted from the decoder 1000 after the entropy decoding using an output (not shown).

Figure 11:
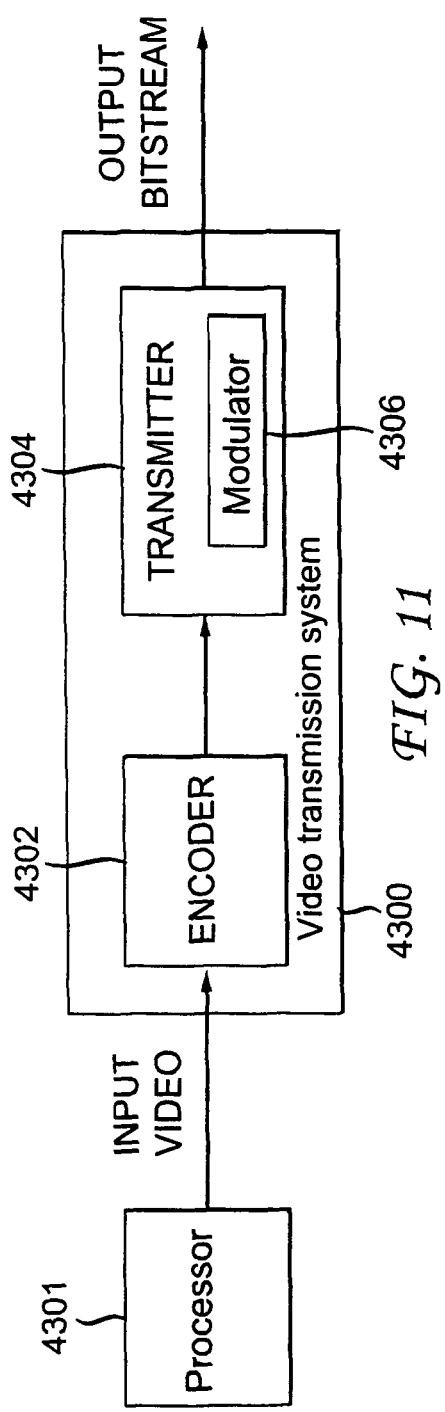
FIG. 11 is a block/flow diagram depicting an example of a video transmission system that may be used with one or more implementations.

Referring now to FIG. 11, a video transmission system/apparatus 4300 is shown. In one implementation, the video transmission system 4300 is a head-end or transmission system for transmitting a signal using any of a variety of media, such as, for example, satellite, cable, telephone-line, or terrestrial broadcast. The transmission may be provided over the Internet or some other network. The video transmission system 4300 is capable of generating and delivering, for example, video content and other content such as, for example, indicators of depth including, for example, depth and/or disparity values.

The video transmission system 4300 receives input video from a processing device 4301. Processing device 4301 is, in one implementation, a processor configured for modifying images so that the modified images have disparity values satisfying a quality condition. Various implementations of the processing device 4301 include, for example, processing devices implementing the algorithms of FIGS. 3-5 and/or an image adjuster 950 described below with respect to FIG. 13.

The video transmission system 4300 includes an encoder 4302 and a transmitter 4304 capable of transmitting the encoded signal. The encoder 4302 receives video information, which may include, for example, images and depth indicators, and generates an encoded signal(s) based on the video information. The encoder 4302 may be, for example, one of the encoders described in detail above. The encoder 4302 may include sub-modules, including for example an assembly unit for receiving and assembling various pieces of information into a structured format for storage or transmission. The various pieces of information may include, for example, coded or uncoded video, coded or uncoded depth indicators and/or information, and coded or uncoded elements such as, for example, motion vectors, coding mode indicators, and syntax elements.

The transmitter 4304 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using modulator 4306. The transmitter 4304 may include, or interface with, an antenna (not shown). Further, implementations of the transmitter 4304 may include, or be limited to, a modulator.

Figure 12:
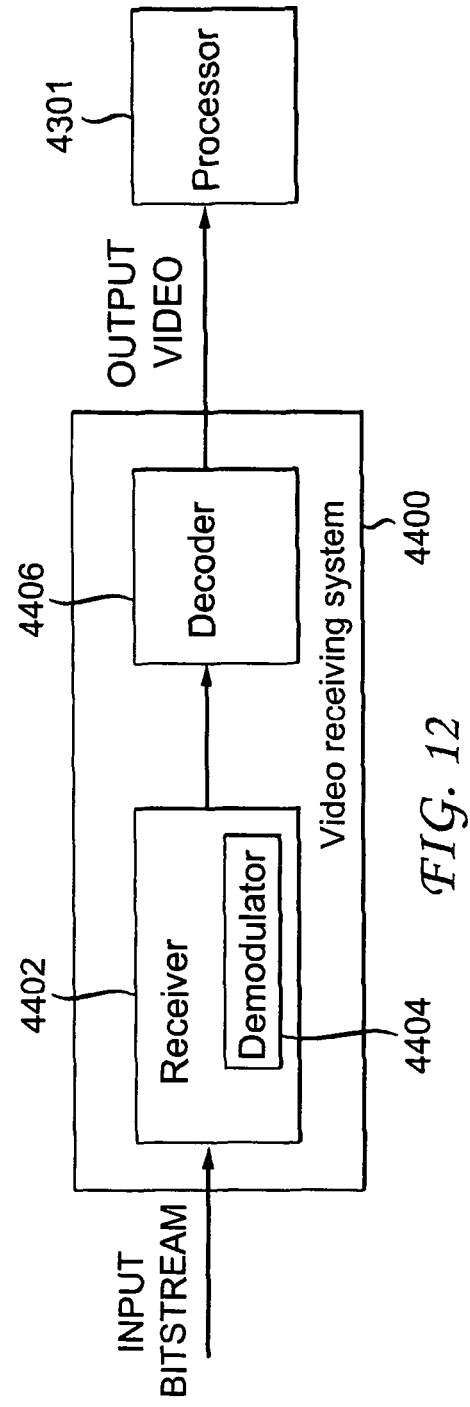
FIG. 12 is a block/flow diagram depicting an example of a video receiving system that may be used with one or more implementations.

Referring now to FIG. 12, a video receiving system/apparatus 4400 is shown. In one implementation, the video receiving system 4400 is configured to receive signals over a variety of media, such as, for example, satellite, cable, telephone-line, or terrestrial broadcast. The signals may be received over the Internet or some other network.

Various implementations of the video receiving system 4400 are, for example, a cell-phone, a computer, a set-top box, a television, or other device that receives encoded video and provides, for example, decoded video for display to a user or for storage. Thus, the video receiving system 4400 may provide its output to, for example, a screen of a television, a computer monitor, a computer (for storage, processing, or display), or some other storage, processing, or display device.

The video receiving system 4400 is capable of receiving and processing video content including video information. The video receiving system 4400 includes a receiver 4402 capable of receiving an encoded signal, such as for example the signals described in the implementations of this application, and a decoder 4406 capable of decoding the received signal.

The receiver 4402 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 4404, de-randomizing the energy in the signal, de-interleaving the data in the signal, and error-correction decoding the signal. The receiver 4402 may include, or interface with, an antenna (not shown). Implementations of the receiver 4402 may include, or be limited to, a demodulator.

The decoder 4406 outputs video signals including, for example, video information. The decoder 4406 may be, for example, the decoder 1000 described in detail above. The output video from the decoder 4406 is provided, in one implementation, to the processing device 4301 as described above with respect to FIG. 11.

Figure 13:
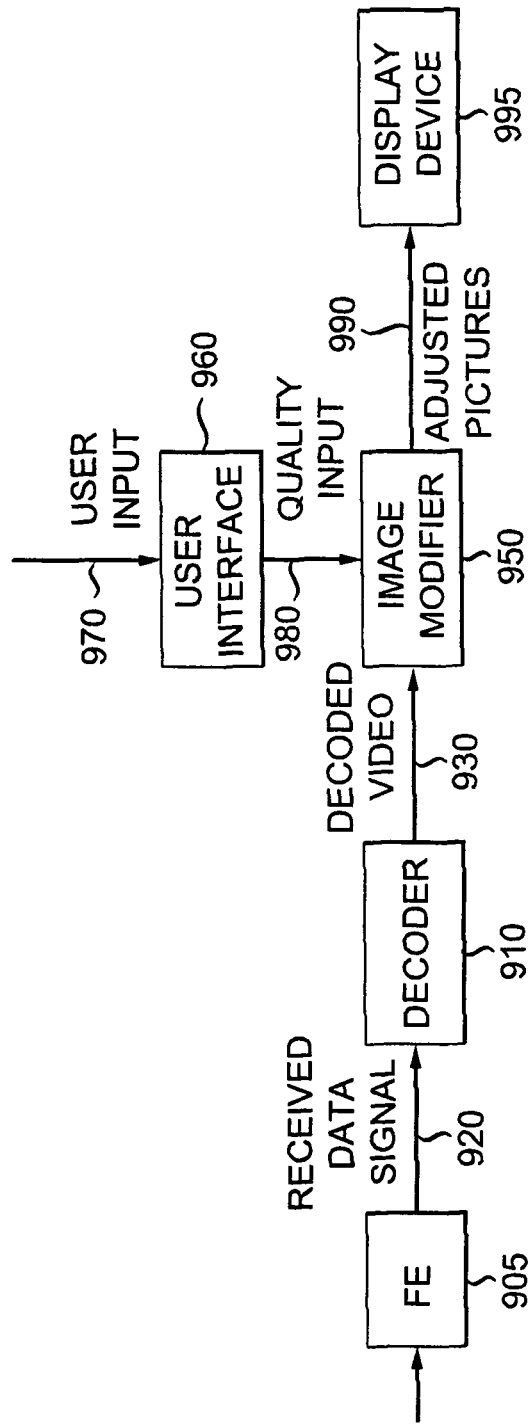
FIG. 13 is a block/flow diagram depicting an example of a signal processing system that may be used with one or more implementations.

Referring to FIG. 13, a video processing device 1300 is shown. In various implementations, the video processing device 1300 is, for example, a set top box or other device that receives encoded video and provides, for example, decoded video for display to a user or for storage (not shown). Thus, the video processing device 1300 may provide its output to a television, computer monitor, or a computer or other processing device.

The video processing device 1300 includes a front-end (FE) device 905 and a decoder 910. The front-end device 905 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 905 may receive the program signal from, for example, an antenna (not shown). The front-end device 905 provides a received data signal to the decoder 910.

The decoder 910 receives a data signal 920. The data signal 920 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC"). SVC refers more specifically to a scalable video coding ("SVC") extension (Annex G) of the AVC standard, referred to as H.264/MPEG-4 AVC, SVC extension (the "SVC extension" or simply "SVC").

The decoder 910 decodes all or part of the received signal 920 and provides as output a decoded video signal 930. The decoded video 930 is provided to the image adjuster 950. The device 1300 also includes a user interface 960 that receives a user input 970. The user interface 960 provides a quality input 980, based on the user input 970, to the image adjuster 950. The quality input 980 and the user input 970 indicate how image disparity values are to be adjusted in order to provide better quality. The quality input is, in various implementations, one of the following: (i) an indication the disparity range should be reduced, (ii) an indication that the disparity range should be increased, (iii) an indication that the disparity rate of change should be reduced, (iv) an indication that the disparity rate of change should be increased, (v) an indication of a desired maximum value for disparity range, (v) an indication of a desired value for maximum disparity rate of change. The image adjuster 950 modifies the images using one or more of the techniques described with respect to FIGS. 3-5, and provides the modified picture(s) as an output 990.

The output modified pictures are provided to a display device 995. In one implementation, the display device 995 is a television.

In various implementations, the image adjuster 950 includes the user interface 960, and in other implementations no user interface 960 is needed because the image adjuster 950 receives the user input 970 directly without a separate interface function being performed. The image adjuster 950 may be implemented in software or as an integrated circuit, for example. In one implementation, the image adjuster 950 is incorporated with the decoder 910, and in another implementation, the decoder 910, the image adjuster 950, and the user interface 960 are all integrated.

In one application, front-end 905 receives a broadcast of various television shows and selects one for processing. The selection of one show is based on user input of a desired channel to watch (not shown). The front-end 905 receives the broadcast and processes the desired show by demodulating the relevant part of the broadcast spectrum, and decoding any outer encoding of the demodulated show. The front-end 905 provides the decoded show to the decoder 910. The decoder 910 is an integrated unit that includes devices 960 and 950. The decoder 910 thus receives the user input, which is a user-supplied indication of quality. The decoder 910 decodes the selected show, and modifies the images of the selected show to provide the desired disparity and satisfy the quality input, and provides the modified images 990 for the shown to the display device 995 for display to a viewer.

Continuing the above application, in one scenario the user changes the desired quality by providing a new input to the decoder 910. After receiving a "quality change" from the user, the decoder 910 begins modifying images from the selected show to produce disparity values that satisfy the new desired quality.

Referring again to FIG. 2, the input device shown in FIG. 2 may be used by the user of device 1300 to provide input regarding quality. A use of the sliders 210, 220 of FIG. 2 by an operator in charge of, for example, camera adjustment and/or post-processing was described above. The sliders of FIG. 2 are used by a TV viewer in another implementation. In that implementation, the TV viewer (user) provides feedback to adjust the disparity based on one or more of (i) comfort, (ii) the type of display, (iii) the size of the display, and (iv) the distance from the viewer to the display.

In other implementations, the input device of FIG. 2 is used to assess the perceived quality of pictures, rather than to indicate a desired level of quality. In various implementations, a processing device uses the assessment of quality to determine what type of modifications to make to the pictures. For example, if the viewer indicates that quality is poor, and in particular that the disparity range is poor, then the system decreases the disparity range of the pictures. The system then waits for the viewer to make a subsequent assessment, and then provides another correction based on the new viewer input. The system, in various implementations, takes into account information describing the type of display device, as well as other available information.

In other implementations, the input device of FIG. 2 is modified to allow the viewer to indicate information such as the viewer's age, the type of display device, the distance from which the viewer is viewing the content. Each of these pieces of information may be used by the implementation to determine how to adjust the disparity of the pictures. For example, older viewers are typically less tolerant of large disparity ranges and rates of change. Additionally, closer viewing distances typically result in a lower tolerance for large disparity ranges and rates of change.

A variety of interesting features are provided by one or more of the implementations described in this application. Implementations include one or more, or none, of these features. The following is a list of some of these features, and this list is not intended to be exhaustive and complete. A first feature is the use of sparse data for disparity, including the use of a sparse data algorithm and the implementation of a sparse disparity map computation. A second feature is the adjustment of disparity using, for example, interpolation, shifting, etc. A third feature is the use of one or more hybrid cameras to generate intermediate views. Hybrid cameras may be used, for example, if disparity is high from the sparse map, because it can allow one to construct a high quality disparity map from a hybrid camera setup and then use the disparity map to generate interpolated views. Hybrid cameras may also be particularly useful in situations where occlusion is present and it may be difficult to get good results by adjusting disparity.

Various implementations use sparse disparity maps or sparse feature sets. The term "sparse", at least in the context of a disparity map indicates a disparity map that has a disparity value for less than all of the pixels of the video image, and usually much less than all. For a high-definition display having 1920×1080 pixels (approximately two million), various implementations provide a sparse disparity map. A first such implementation provides approximately 1000 disparity values in the sparse disparity map. A second such implementation provides up to approximately 10,000 disparity values in the sparse disparity map. A third such implementation provides up to approximately 10% (approximately 200,000) of the pixels with a disparity value in the sparse disparity map. A fourth such implementation provides up to approximately 20% (approximately 400,000) of the pixels with a disparity value in the sparse disparity map.

Various implementations refer to "images", "video", or "frames". Such implementations may, more generally, be applied to "pictures", which may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. A "picture" may also refer, for example, to a frame, a field, or an image. The term "pictures" may also, or alternatively, refer to various different types of content, including, for example, typical two-dimensional video, a disparity map for a 2D video picture, or a depth map that corresponds to a 2D video picture.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, identifying the information, or retrieving the information from memory.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

One or more implementations having particular features and aspects are thereby provided. However, variations of these implementations and additional applications are contemplated and within our disclosure, and features and aspects of described implementations may be adapted for other implementations.

For example, these implementations may be extended to apply to multi-view applications in which the pictures are to be adjusted in order to control the disparity between the views. These implementations may also be extended to apply to different indicators of depth besides, or in addition to, disparity. One such indicator of depth is the actual depth value. It is also well-known that the actual depth values and disparity values are directly derivable from each other based on camera parameters, as explained above. Additionally, the present principles may also be used in the context of coding video and/or coding other types of data. Additionally, these implementations and features may be used in the context of, or adapted for use in the context of, a standard. Several such standards are H.264/MPEG-4 AVC (AVC), the extension of AVC for multi-view coding (MVC), the extension of AVC for scalable video coding (SVC), and the proposed MPEG/JVT standards for 3-D Video coding (3DV) and for High-Performance Video Coding (HVC), but other standards (existing or future) may be used. Of course, the implementations and features need not be used in a standard.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:
1. A method comprising:
accessing a first image and a second image that form a stereo image pair;
generating a disparity map for a set of features from the first image that are matched to features in the second image;
determining multiple quality measures based on disparity values from the disparity map for less than all features in the first image, the multiple quality measures including maximum disparity for the stereo image pair and minimum disparity for the stereo image pair, and the multiple quality measures each having a corresponding target quality range;
determining that at least one of the multiple quality measures is outside of the corresponding target quality range;

modifying at least the first image relative to the second image, such that disparity for the set of features in the first image is also modified, and the at least one quality measure is moved into the corresponding target quality range, wherein modifying the first image comprises using an additional image, different from the first image and the second image, and wherein the additional image includes one or more features from the set of features, wherein the stereo image pair is higher resolution than the additional image;

generating a lower resolution stereo image pair by downsampling the stereo image pair;

generating a low resolution disparity map using the downsampled stereo image pair and the additional image;

generating a high resolution disparity map by upsampling the low resolution disparity map using the higher resolution stereo image pair; and rendering a modified first image based on the high resolution disparity map and the determined quality measure.

2. The method of claim 1 wherein modifying at least the first image results in all of the multiple quality measures being within the corresponding target quality ranges.

3. The method of claim 1 wherein modifying at least the first image comprises shifting at least the first image relative to the second image, such that the disparity for the set of features in the first image is also modified, and the at least one quality measure is moved into the corresponding target quality range.

4. The method of claim 1 wherein the disparity map is sparse.

5. The method of claim 1 wherein generating the disparity map comprises using a feature matching algorithm.

6. The method of claim 5 wherein the feature matching algorithm comprises at least one of scale-invariant feature transform, k-dimensional tree analysis, or random sample consensus.

7. The method of claim 1 wherein generating the disparity map comprises using a median filter to filter disparity values.

8. The method of claim 7 wherein the median filter is applied to disparity values for a particular object across all frames from a sequence.

9. The method of claim 1 wherein the quality measure is for at least one of a frame or a sequence.

10. The method of claim 1 wherein the quality measure comprises at least one of rate of change of maximum disparity, rate of change of minimum disparity.

11. The method of claim 1 wherein modifying the first image, in response to the determined quality measure, comprises determining that the quality measure does not satisfy at least one of a user preference or a capability of a display device.

12. An apparatus comprising:
a processor operative to access a first image and a second image that form a stereo image pair,
generate a disparity map for a set of features from the first image that are matched to features in the second image,
determine multiple quality measures based on disparity values from the disparity map for less than all features in the first image, the multiple quality measures including maximum disparity for the stereo image pair and minimum disparity for the stereo image pair, and the multiple quality measures each having a corresponding target quality range;
determine that at least one of the multiple quality measures is outside of the corresponding target quality range, and
modify at least the first image relative to the second image, such that disparity for the set of features in the first image is also modified, and the at least one quality measure is moved into the corresponding target quality range, wherein modifying the first image uses an additional image, different from the first image and the second image, and wherein the additional image includes one or more features from the set of features, wherein the stereo image pair is higher resolution than the additional image, generating glower resolution stereo image pair by downsampling the stereo image pair, generating a low resolution disparity map using the downsampled stereo image pair and the additional image, generating a high resolution disparity map by upsampling the low resolution disparity map using the higher resolution stereo image pair; and rendering a modified first image based on the high resolution disparity map and the determined quality measure.

13. An apparatus, comprising one or more processing devices collectively configured to perform at least the following:
accessing a first image and a second image that form a stereo image pair;
generating a disparity map for a set of features from the first image that are matched to features in the second image;
determining multiple quality measures based on disparity values from the disparity map for less than all features in the first image, the multiple quality measures including maximum disparity for the stereo image pair and minimum disparity for the stereo image pair, and the multiple quality measures each having a corresponding target quality range;
determining that at least one of the multiple quality measures is outside of the corresponding target quality range; and
modifying at least the first image relative to the second image, such that disparity for the set of features in the first image is also modified, and the at least one quality measure is moved into the corresponding target quality range, wherein modifying the first image uses an additional image, different from the first image and the second image, and wherein the additional image includes one or more features from the set of features, wherein the stereo image pair is higher resolution than the additional image;
generating a lower resolution stereo image pair by downsampling the stereo image pair;
generating a low resolution disparity map using the downsampled stereo image pair and the additional image;
generating a high resolution disparity map by upsampling the low resolution disparity map using the higher resolution stereo image pair; and
rendering a modified first image based on the high resolution disparity map and the determined quality measure.

14. The apparatus of claim 13 wherein the one or more devices comprises (i) one or more processors, (ii) one or more encoders, or (iii) one or more decoders.

15. The apparatus of claim 13 wherein the one or more devices comprises one or more of a set-top box, a cell-phone, a computer, or a PDA.

16. The apparatus of claim 13 further comprising:
a stereo camera for capturing the stereo image pair; and
an additional camera, different from the stereo camera, for capturing an additional image, wherein the additional image includes one or more features from the set of features, and
wherein modifying the first image comprises using the additional image.

17. The apparatus of claim 16 wherein the stereo camera is higher resolution than the additional camera.

18. A non-transitory computer readable tangible media having stored thereon instructions for causing a processor to perform at least the following:
- accessing a first image and a second image that form a stereo image pair;
- generating a disparity map for a set of features from the first image that are matched to features in the second image;
- determining multiple quality measures based on disparity values from the disparity map for less than all features in the first image, the multiple quality measures including maximum disparity for the stereo image pair and minimum disparity for the stereo image pair, and the multiple quality measures each having a corresponding target quality range;
- determining that at least one of the multiple quality measures is outside of the corresponding target quality range;
- modifying at least the first image relative to the second image, such that disparity for the set of features in the first image is also modified, and the at least one quality measure is moved into the corresponding target quality range, wherein modifying the first image uses an additional image, different from the first image and the second image, and wherein the additional image includes one or more features from the set of features, wherein the stereo image pair is higher resolution than the additional image;
- generating a lower resolution stereo image pair by downsampling the stereo image pair;
- generating a low resolution disparity map using the downsampled stereo image pair and the additional image;
- generating a high resolution disparity map by upsampling the low resolution disparity map using the higher resolution stereo image pair; and
- rendering a modified first image based on the high resolution disparity map and the determined quality measure.

19. The non-transitory processor readable tangible media of claim 18 wherein modifying at least the first image results in all of the multiple quality measures being within the corresponding target quality ranges.

20. The non-transitory processor readable tangible media of claim 18 wherein modifying at least the first image comprises shifting at least the first image relative to the second image, such that the disparity for the set of features in the first image is also modified, and the at least one quality measure is moved into the corresponding target quality range.

21. The non-transitory processor readable tangible media of claim 18 wherein the disparity map is sparse.

22. The non-transitory processor readable tangible media of claim 18 wherein generating the disparity map comprises using a feature matching algorithm.

23. The non-transitory processor readable tangible media of claim 22 wherein the feature matching algorithm comprises at least one of scale-invariant feature transform, k-dimensional tree analysis, or random sample consensus.

24. The non-transitory processor readable tangible media of claim 18 wherein generating the disparity map comprises using a median filter to filter disparity values.

25. The non-transitory processor readable tangible media of claim 24 wherein the median filter is applied to disparity values for a particular object across all frames from a sequence.

26. The non-transitory processor readable tangible media of claim 18 wherein the quality measure is for at least one of a frame or a sequence.

27. The non-transitory processor readable tangible media of claim 18 wherein the quality measure comprises at least one of rate of change of maximum disparity, rate of change of minimum disparity.

28. The non-transitory processor readable tangible media of claim 18 wherein modifying the first image, in response to the determined quality measure, comprises determining that the quality measure does not satisfy at least one of a user preference or a capability of a display device.

* * * * *